United States Patent [19]

Robinson

[11] Patent Number: 5,745,733
[45] Date of Patent: Apr. 28, 1998

[54] COMPUTER SYSTEM INCLUDING A PORTABLE PORTION AND A STATIONARY PORTION PROVIDING BOTH UNI-PROCESSING AND MULTIPROCESSING CAPABILITIES

[75] Inventor: Michael G. Robinson, Kettering, Ohio

[73] Assignee: NCR Corporation, Dayton, Ohio

[21] Appl. No.: 513,108

[22] Filed: Aug. 9, 1995

[51] Int. Cl.$^6$ .................................................. G06F 15/16
[52] U.S. Cl. ................ 395/500; 395/200.1; 395/200.12; 395/311
[58] Field of Search ...................... 395/500, 325, 395/893, 671, 281, 800, 200.01, 200.02, 200.05, 200.1, 200.12, 280, 311; 364/708, 708.1; 361/686; 368/10

[56] References Cited

U.S. PATENT DOCUMENTS

| | | | |
|---|---|---|---|
| 4,769,764 | 9/1988 | Levanon | 364/708 |
| 4,903,222 | 2/1990 | Carter et al. | 364/708 |
| 5,278,730 | 1/1994 | Kikinis | 361/686 |
| 5,313,596 | 5/1994 | Swindler et al. | 395/325 |
| 5,323,291 | 6/1994 | Boyle et al. | 361/683 |
| 5,396,400 | 3/1995 | Register et al. | 361/686 |
| 5,493,542 | 2/1996 | Odelid | 368/10 |
| 5,517,434 | 5/1996 | Hanson et al. | 364/708.1 |
| 5,522,089 | 5/1996 | Kikinis et al. | 395/893 |
| 5,537,343 | 7/1996 | Kikinis et al. | 364/708.1 |
| 5,579,528 | 11/1996 | Register | 395/671 |
| 5,598,537 | 1/1997 | Swanstrom et al. | 395/281 |
| 5,598,539 | 1/1997 | Gephardt et al. | 395/281 |
| 5,600,800 | 2/1997 | Kikinis et al. | 395/281 |
| 5,604,663 | 2/1997 | Shin et al. | 361/686 |
| 5,625,829 | 4/1997 | Gephardt et al. | 395/800 |

OTHER PUBLICATIONS

"A Mobile Networking System based on Internet Protocol", by C. Perkins and P. Bhagwat, IEEE Personal Communications, First Quarter 1994, pp. 32–41.

"Use of a Relational Database for Patient- and Data-Management in the Electrophysiologic Catheter Laboratory", by Schneider et al.,IEEE, Computers in Cardiology, 1994, pp. 513–515.

Primary Examiner—Kevin J. Teska
Assistant Examiner—Russell W. Frejd
Attorney, Agent, or Firm—Ying Tuo

[57] ABSTRACT

A computer system includes a stationary portion having at least one stationary processor module and portable portion having at least one portable processor module. The stationary processor module can operate the stationary portion independently when the portable portion is removed from the stationary portion. In one embodiment, the stationary processor module and portable processor module can operate the stationary portion in parallel fashion, when the portable portion is connected to the stationary portion. In another embodiment, the portable processor module can take over the stationary processor module to operate the stationary portion, when the portable portion is connected to the stationary portion

10 Claims, 9 Drawing Sheets

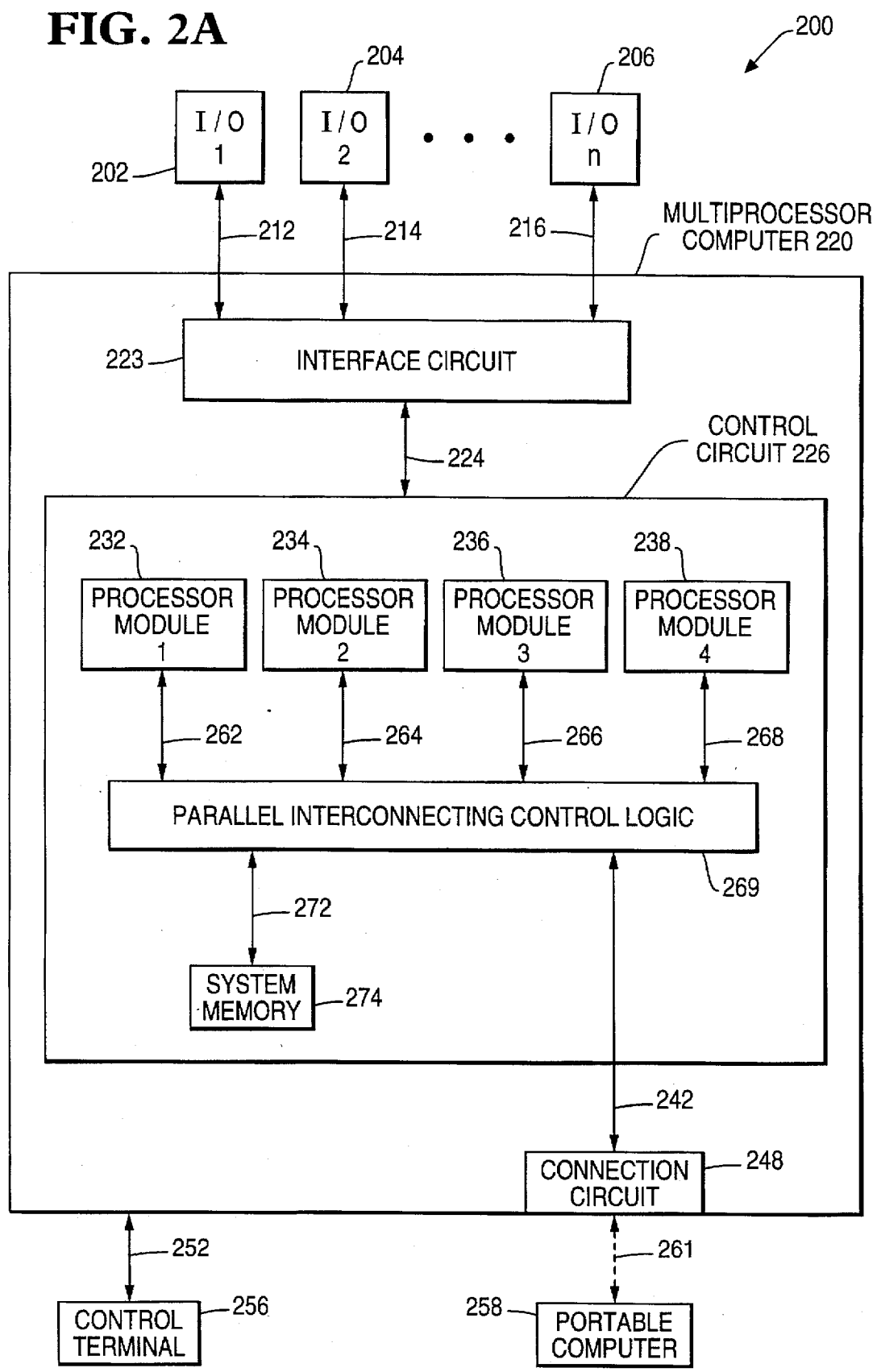

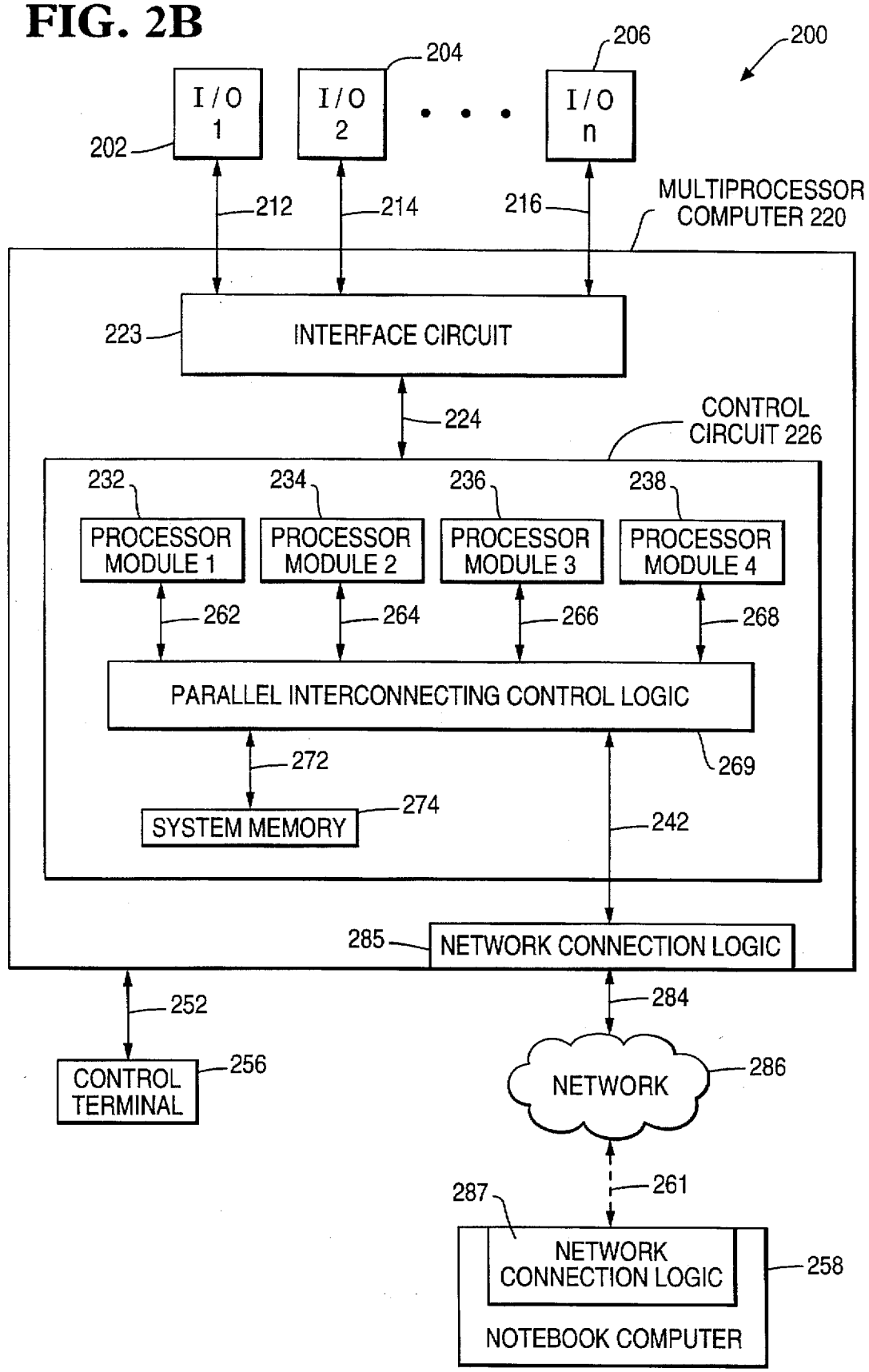

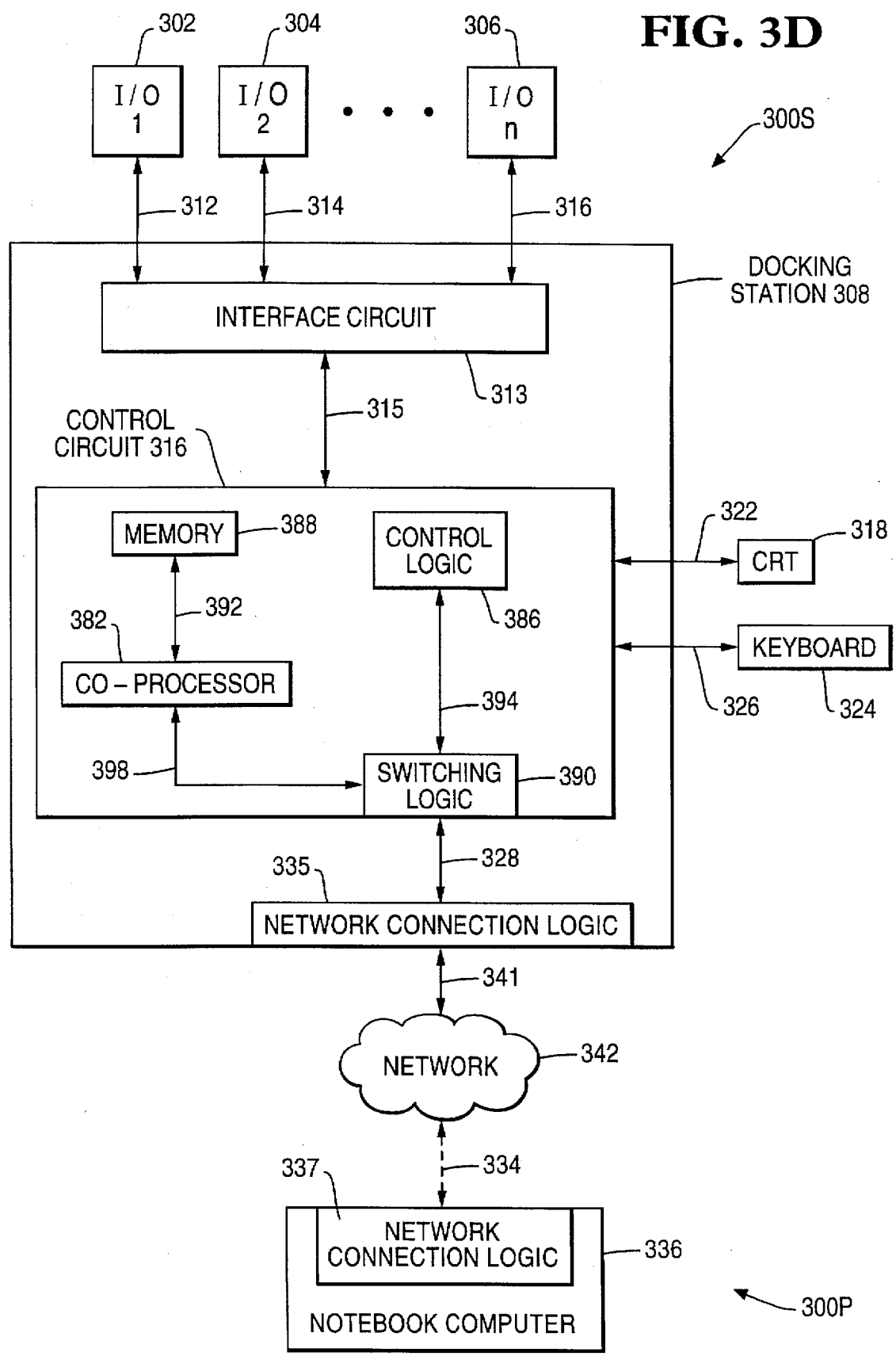

COMPUTER SYSTEM INCLUDING A PORTABLE PORTION AND A STATIONARY PORTION PROVIDING BOTH UNI-PROCESSING AND MULTIPROCESSING CAPABILITIES

BACKGROUND OF THE INVENTION

The present invention relates to computer systems and, more particularly, to a computer system having a portable portion and a stationary portion.

To have both the portability and processing capability, a typical computer system can be divided into two portions, a portable portion and a stationary portion. Usually, the portable portion contains only a part of the hardware and software of the computer system, which are able to perform certain functions independently from the stationary portion.

The stationary portion contains the remaining part of the hardware and software of the computer system. Being connected together, the portable portion and stationary portion can perform the full functions desired by a specific user.

FIG. 1 depicts an exemplary computer system including stationary portion 100S, and portable portion 100P, which can be a notebook computer 136. Stationary portion 100S includes n input/output devices (I/O 1, I/O 2, ... ,I/O n) and docking station 108. The docking station includes interface circuit 113, and connection logic 132.

When notebook computer 136 is connected to stationary portion 100S via link 134, it can provide control signals to interface circuit 113 via connection logic 132. Thus, the notebook computer can control the operation of the docking station and input/output devices.

One problem to the arrangement shown in FIG. 1 is that all peripherals connected to the stationary portion are unusable when the portable portion is removed from the computer system. The peripherals may represent substantial investments.

Another problem to the arrangement shown in FIG. 1 is the processing capability of the computer system is limited by the capacity of the portable portion. For example, notebook computer 136 can be used to collect scientific or business data in a remote site from the stationary portion. When the notebook is connected to the stationary portion, docking station 108 does not provide additional processing power to the process the scientific or business data.

Still another problem to the arrangement shown in FIG. 1 is that the connection of the portable portion is limited to the vicinity of the stationary portion.

Therefore, there is a need for a computer system whose input/output devices can be efficiently used when the associated portable portion is removed from the computer system.

There is another need for a computer system whose stationary portion can provide additional processing capability to the associated portable portion when the associated portable portion is connected to the computer system.

There is a further need for a computer system whose portable portion can be remotely connected to the stationary portion.

Therefore, it is desirable to provide an improved computer system to meet these needs.

SUMMARY OF THE INVENTION

In one aspect, this invention provides a novel computer system, which comprises:

a stationary portion including a plurality of stationary processor modules;

a portable portion including a portable processor module; and interface circuitry for connecting the plurality of stationary processor modules to enable the stationary processor modules to be operated in a parallel fashion when the portable processor module is disconnected from the stationary processor modules, and for connecting the plurality of stationary modules and portable module to enable the stationary processor modules and the portable processor model to be operated in a parallel fashion when the portable processor module is connected to the stationary portion;

wherein the portable portion is able to operate independently after being disconnected from the stationary portion.

In another aspect, this invention provides a novel computer system, which comprises:

a stationary portion including at least one stationary processor module;

a portable portion including a portable processor module; and switching circuit for switching the stationary processor module and the portable processor module;

wherein the switching circuit is able to disconnect the stationary processor module from the stationary portion when the portable processor is coupled to the stationary portion;

wherein the switching circuit is able to connect the stationary processor module to the stationary portion when the portable processor is disconnected from the stationary portion.

BRIEF DESCRIPTION OF THE DRAWING

The features and advantages of the present invention will become apparent to those skilled in the art to which the invention relates from the subsequent description of the preferred embodiments and the appended claims, in conjunction with the accompanying drawing in which:

FIG. 2A depicts a computer system, including a multi-processor computer and a portable computer, in accordance with one embodiment of the present invention;

FIG. 2B depicts a computer system, including a multi-processor computer and a portable computer, where said portable computer can be connected to the multiprocessor computer via a network, in accordance with another embodiment of the present invention;

FIG. 3D depicts a computer system, including stationary portion 300S having a co-processor and a switching logic, and portable portion 300P, where the portable portion can be connected to the stationary portion via network, in accordance with another embodiment of the present invention;

DETAILED DESCRIPTION OF THE EMBODIMENTS

Figure 1:
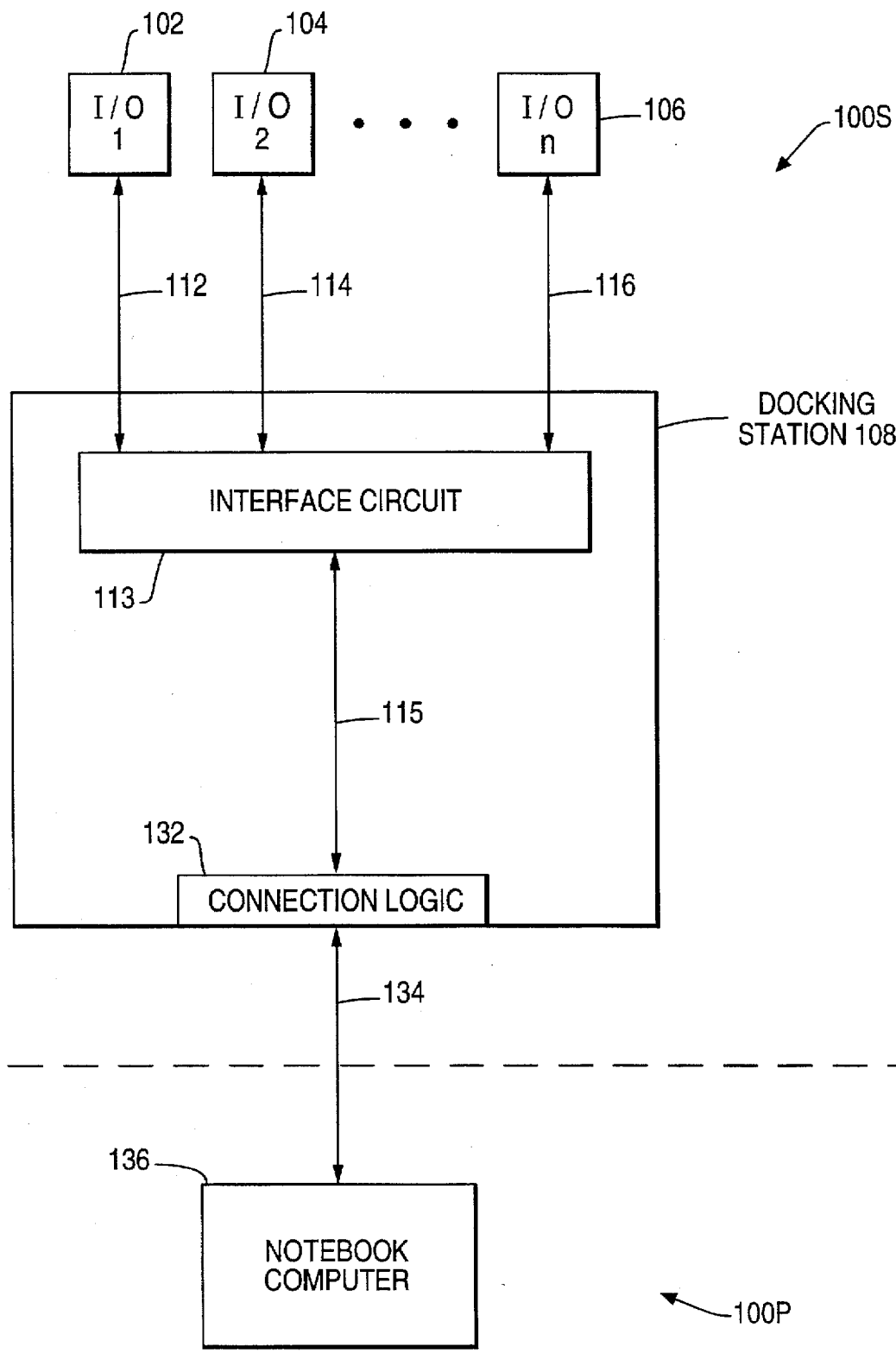
FIG. 1 depicts an exemplary conventional computer system, including a portable portion and a stationary portion.

FIG. 2A depicts computer system 200 in accordance with one embodiment of the present invention. The computer system includes multiprocessor computer 220; control terminal 256, possibly including a CRT display and a keyboard; portable computer 258; and input/output devices, including I/O 1 (202), I/O 2 (204), . . . , I/O n (206).

Multiprocessor computer 220 includes interface circuit 223, control circuit 226, and connection circuit 248.

Control circuit 226 includes four processor modules (232, 234, 236, 238), parallel interconnecting control logic 269, and system memory 274.

Each of the four processors may contain more than one processor.

I/O 1 (202), I/O 2 (204), . . . , I/O n (206) can be different types of input/output devices. For example, I/O 1 can be a color laser printer, I/O 2 can be a high capacity disk driver, and I/O n can be communication facilities.

Interface circuit 223 includes buffers, buses and circuits (not shown), which are necessary to operate the input/output devices.

Parallel interconnecting control logic 269 contains the memory for storing parallel management software. Under the control of the parallel interconnecting control logic and the parallel management software, the four processor modules operate in parallel fashion. Each of the four processors has access to system memory 274 via the parallel interconnecting control logic.

Portable computer 258 can be a notebook computer.

Input/output devices 202, 204, 206 are connected to interface circuit 223 via lines 212, 214, 216, respectively.

Interface circuit 223 is connected to control circuit 226 via line 224.

Within control circuit 226, the four processor modules (232, 234, 236, 238) are connected to parallel interconnecting control logic 269 via lines 262, 264, 266, 268, respectively. System memory 274 is connected to parallel interconnecting control logic 269 via line 272.

Connection circuit 248 is connected to parallel interconnecting control logic 269 via line 242.

Portable computer 258 is connected to connection circuit 248 via communication channel 261, which can be a metal cable, a fiber cable, or a wireless communication channel. Connection circuit 248 has the capability to receive data and control signals from the metal cable, fiber cable or wireless communication channel, and to deliver the data and control signals to parallel interconnecting control logic 269. Through line 242, the connection circuit also has the capability to pass data and control signals from parallel interconnecting control logic 269 to communication channel 261.

In operation, when portable computer 258 is connected to connection circuit 248, it acts as a processor module of multiprocessor computer 220. Under the control of the parallel interconnecting control logic and the parallel management software, processor modules 1–4 and portable computer 258 operate in parallel fashion. When portable computer 258 is removed from multiprocessor computer 220, processor modules can operate in parallel fashion without the portable computer.

It should be noted that the present invention shown in FIG. 2A can use all hardware and software resources to process the data collected by and stored in portable computer 258.

FIG. 2B depicts computer system 200 in accordance with another embodiment of the present invention. The elements and connections shown in FIGS. 2A and 2B are similar, except that in FIG. 2B portable computer 258 is connected to multiprocessor computer 220 via network 286 and network connection logic 287 is added into portable computer 258.

Figure 3A:
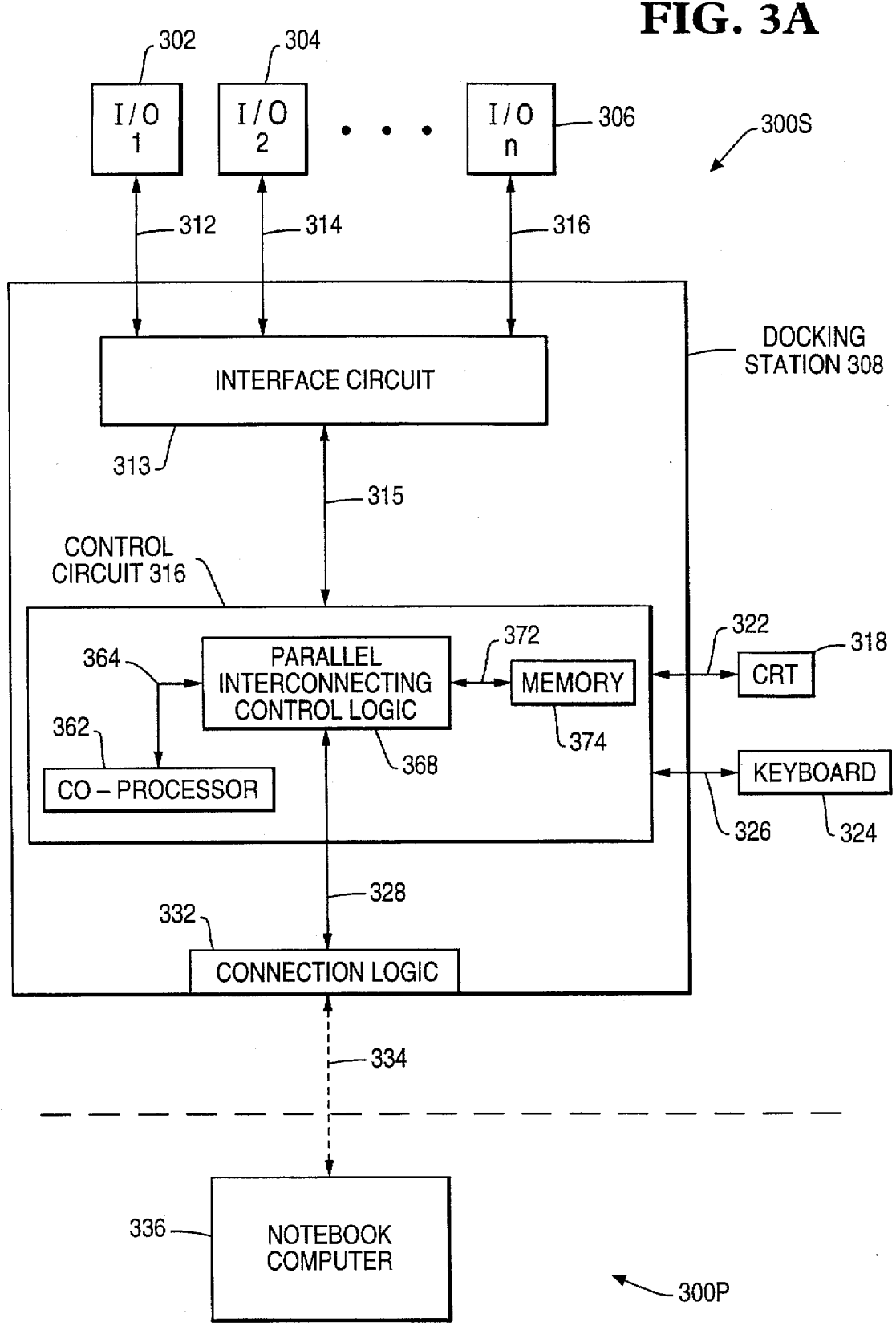
FIG. 3A depicts a computer system, including stationary portion 300S having a co-processor and a parallel interconnecting logic, and portable portion 300P, in accordance with another embodiment of the present invention.

FIG. 3A depicts a computer system including stationary portion 300S and portable portion 300P, in accordance with another embodiment of the present invention.

Portable portion 300P can be a notebook computer 336.

Stationary portion 300S includes input/output devices (I/O 1, I/O 2, . . . , I/O n) and docking station 308.

I/O 1, I/O 2, . . . , I/O n can be different types of input/output devices. For example, I/O 1 can be a color laser printer, I/O 2 a CD-ROM driver, and I/O n a color scanner.

Docking station 308 includes interface circuit 313, control circuit 316, and connection logic 332.

Control circuit 316 includes co-processor 362, parallel interconnecting control logic 368, and memory 374.

Input/output devices 302, 304, 306 are connected to interface circuit 313 via lines 312, 314, 316, respectively.

Within docking station 308, interface circuit 313 is connected to control circuit 316 via line 315, and connection logic 332 is connected to parallel interconnecting control logic via line 328.

Within control circuit 316, co-processor 362 and memory 374 are connected to parallel interconnecting control logic 368 via lines 364 and 372 respectively. The parallel interconnecting control logic contains parallel management software.

CRT display 318 and keyboard 324 are connected to control circuit 316 via lines 322 and 326 respectively. CRT display 318 and keyboard 324 serve as a secondary control terminal for the docking station, when notebook computer 336 is removed from stationary portion 300S. The CRT display and keyboard can also serve as the control terminal when the notebook computer is connected to the docking station.

Portable computer 300P is connected to connection logic 332 via communication channel 334, which can be a metal cable, a fiber cable, or a wireless communication channel. Connection logic 332 has the capability to receive data and control signals from the metal cable, fiber cable or wireless communication channel, and to deliver the data and control signals to control circuit 316. Through line 328, the connection circuit also has the capability to pass data and control signal signals to communication channel 334.

In operation, when the notebook computer is connected to connection circuit 332, co-processor 362 and notebook computer 336 operate in parallel fashion, under the control of parallel interconnecting control logic 368 and the parallel management software. When notebook computer 336 is removed from the connection circuit, co-processor 362 can operate docking station 306 and input/output devices independently.

Figure 3B:
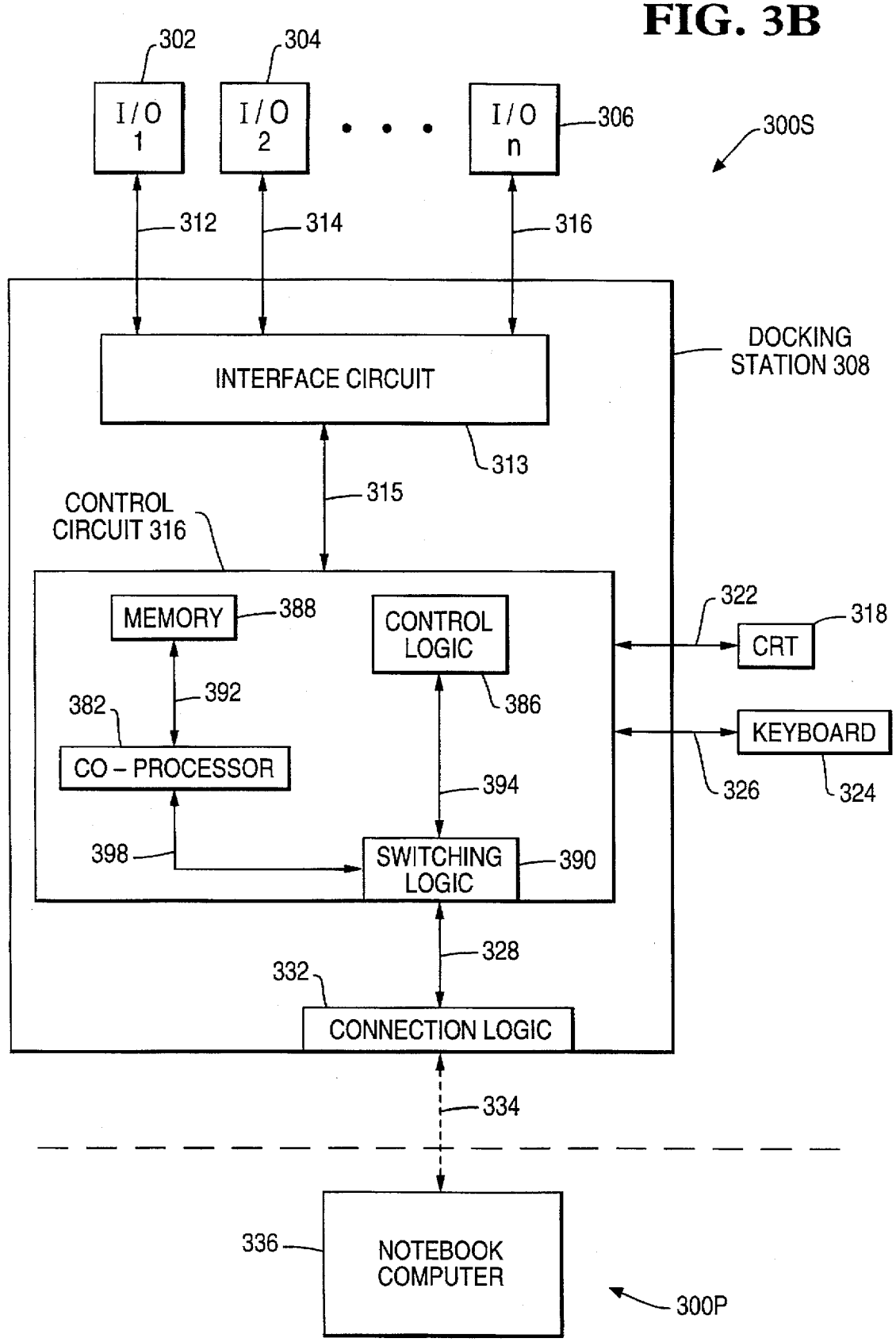
FIG. 3B depicts a computer system, including stationary portion 300S having a co-processor and a switching logic, and portable portion 300P, in accordance with another embodiment of the present invention.

FIG. 3B depicts a computer system including stationary portion 300S and portable portion 300P, in accordance with another embodiment of the present invention.

The elements and connections shown in FIGS. 3A and 3B are similar, except that the structures within control circuits 316 in the two embodiments are different.

In FIGS. 3A and 3B, the similar elements and connections use same labeling numerals. These similar elements and connections in FIG. 3B have been described in the embodiment shown in FIG. 3A, and thus they will not be further described in the embodiment shown in FIG. 3B.

Referring to FIG. 3B, control circuit 316 includes co-processor 382, control logic 386, memory 388 and switching logic 390.

Memory 388 is connected to co-processor 382 via line 392. Co-processor 382 and connection logic 332 are connected to switching logic 390 via lines 398 and 328, respectively. Switching logic 390 is connected to control logic 386 via line 394.

Co-processor 382 and notebook computer 336 are connected to control logic 386 under control of switching logic 390.

Control logic 386 can provide data and control signals received either from co-processor 382 or notebook computer 336 to interface circuit 313.

In operation, when notebook 336 is connected to connection logic 332 to operate docking station 308, switching logic 390 deactivates line 398, and activates lines 328. Therefore, notebook computer 336 controls the operation of the docking station 308 and input/output devices.

When notebook computer 336 is removed from docking station 308, switching logic 390 activates line 398, and deactivates line 328. Therefore, co-processor 382 controls the operation of the docking station 308 and input/output devices.

It should be noted that the control logic 386 and switching logic 390 in FIG. 3B are simpler logic circuits than parallel interconnecting control logic 368 in FIG. 3A. Thus, if same type of co-processors are used in these two computer systems, the cost of the computer system in FIG. 3B is lower than that in FIG. 3A.

Figure 3C:
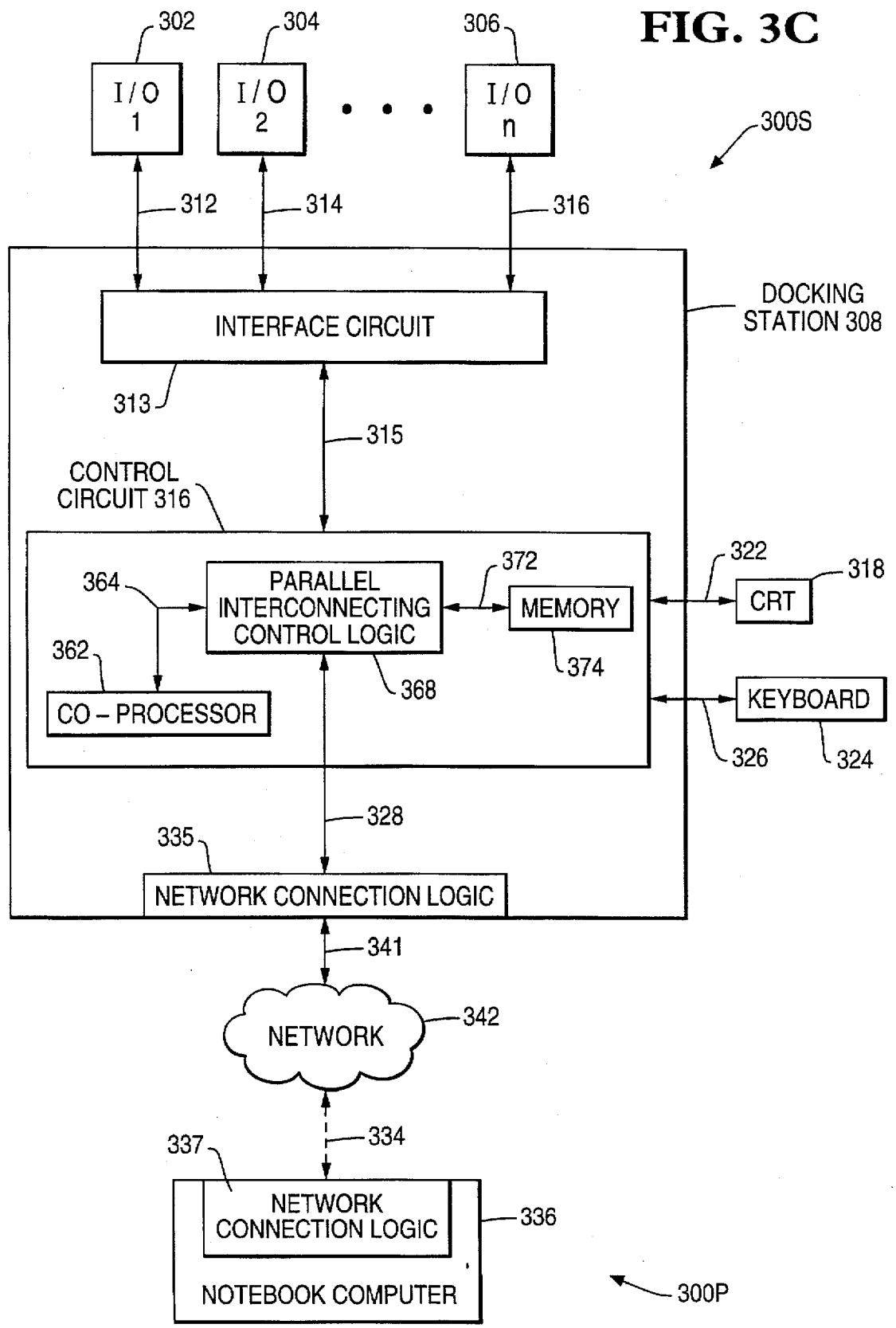
FIG. 3C depicts a computer system, including stationary portion 300S having a co-processor and a parallel interconnecting logic, and portable portion 300P, where the portable portion can be connected to the stationary portion via a network, in accordance with another embodiment of the present invention.

FIG. 3C depicts a computer system, including stationary portion 300S having co-processor 362 and parallel interconnecting logic 368, and portable portion 300P, where the portable portion can be connected to the stationary portion via network 342, in accordance with another embodiment of the present invention.

The elements and connections shown in FIGS. 3A and 3C are similar, except that: (1) connection logic 332 in FIG. 3A is replaced by network connection logic 335, which is connected to network 342 via link 341, (2) network connection logic 337 is added into notebook computer 336, and (3) through network connection logic 337, notebook computer 336 is connected to network 342 via communication channel 334.

In FIGS. 3A and 3C, the similar elements and connections use same labeling numerals. These similar elements and connections in FIG. 3C have been described in the embodiment shown in FIG. 3A, and thus they will not be further described in the embodiment shown in FIG. 3C.

FIG. 3D depicts a computer system, including stationary portion 300S having co-processor 382 and switching logic 390, and portable portion 300P, where the portable portion can be connected to the stationary portion via network 342, in accordance with another embodiment of the present invention.

The elements and connections shown in FIGS. 3B and 3D are similar, except that: (1) connection logic 332 in FIG. 3B is replaced by network connection logic 335, which is connected to network 342 via link 341, (2) network connection logic 337 is added into notebook computer 336, and (3) through network connection logic 337, notebook computer 336 is connected to network 342 via communication channel 334.

In FIGS. 3B and 3D, the similar elements and connections use same labeling numerals. These similar elements and connections in FIG. 3D have been described in the embodiment shown in FIG. 3B, and thus they will not be further described in the embodiment shown in FIG. 3D.

Figure 3E:
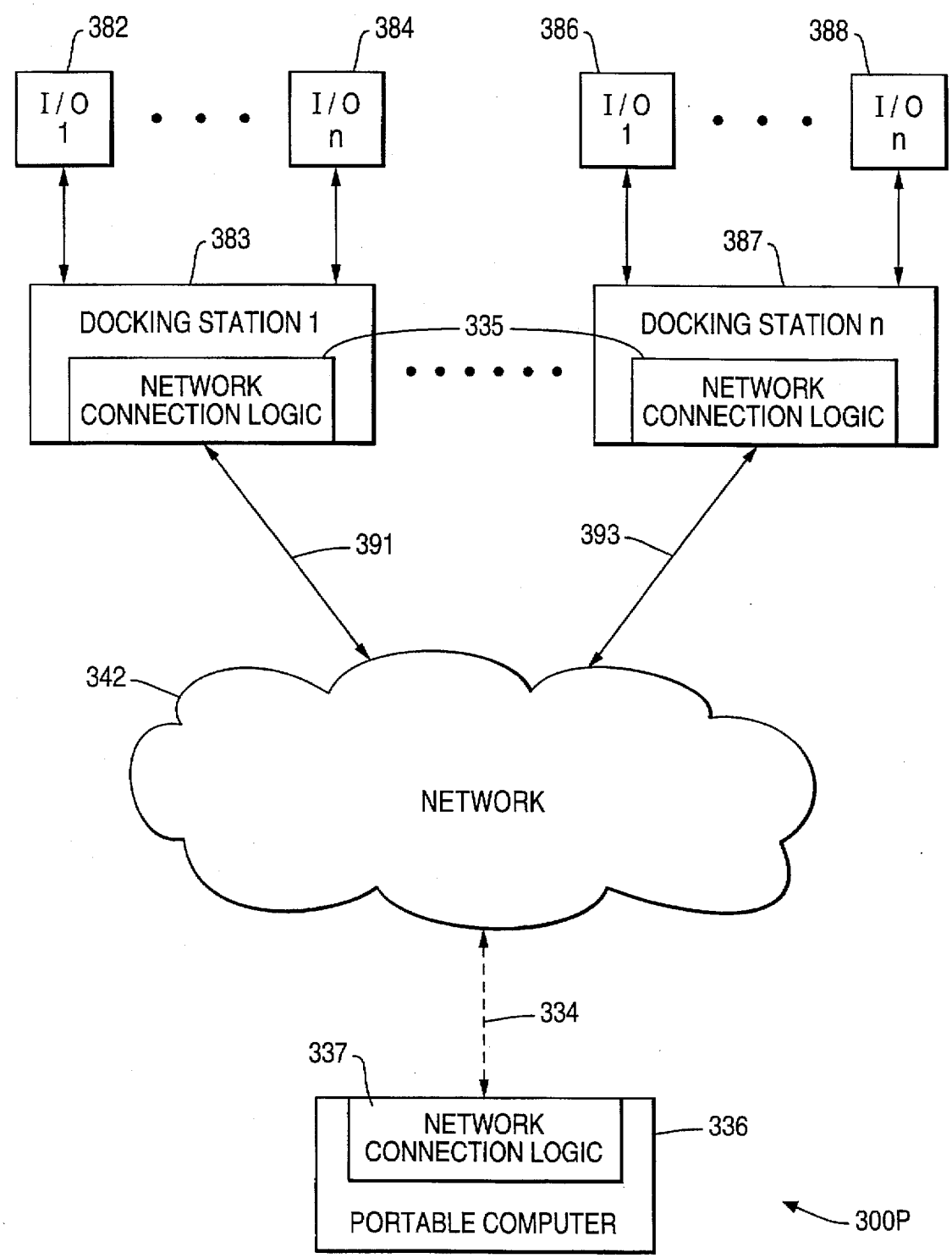
FIG. 3E depicts a configuration, including a plurality of stationary portions and a portable portion, where the portable portion can be connected to the plurality of stationary portions via a network, in accordance with another embodiment of the present invention.

FIG. 3E depicts a configuration, including a plurality of stationary portions (i.e. docking stations 1, . . . , n) and a portable computer 336, where the portable computer can be connected to any one of the plurality of stationary portions via network 342, in accordance with another embodiment of the present invention.

The docking stations can be the ones shown in FIG. 3C or 3D. Each of the docking stations has a plurality input/output devices (I/O 1, . . . , I/O n). Docking stations 1, . . . , n are connected to network 342 via links 391, . . . , 393 respectively.

Portable computer 336 is connected to network 342 via communication channel 334, which can be a metal cable, a fiber cable, or a wireless communication channel.

Figure 4:
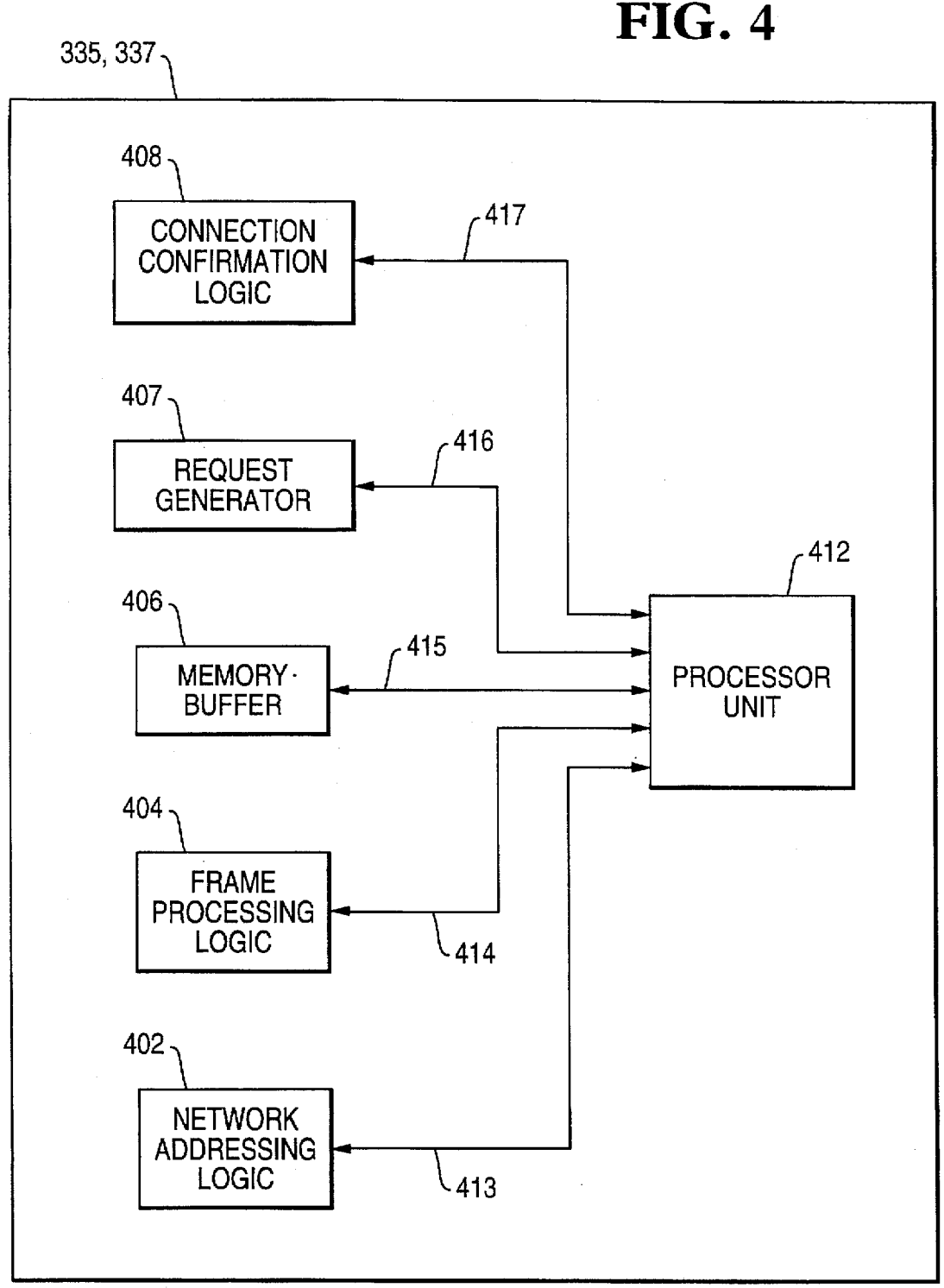
FIG. 4 depicts network connection logics shown in FIGS. 3C–3E in greater detail, in accordance with the present invention.

FIG. 4 depicts network connection logics 285 and 287 shown in FIG. 2B, and network connection logics 335 and 337 shown in FIGS. 3C-3E, in greater detail. The network connection logic includes network addressing logic 402, frame processing logic 404, memory buffer 406, request generator 407, connection confirmation logic 408, and processor unit 412. Network addressing logic 402, frame processing logic 404, memory buffer 406, request generator 407, and connection confirmation logic 408 are connected to processor unit 412 via lines 413-417 respectively.

Each of the docking stations and portable computers shown in FIGS. 2B and 3C-3E has a unique address assigned to it. Network addressing logic 402 contains the hardware and software to define and identify the address for the multiprocessor computer (shown in FIG. 2B), a docking station or a portable computer (shown in FIGS. 2B and 3C-3E), connected to the network.

Network 286 (or 342) transmits information frame-by-frame in accordance with specific network protocols. Frame processing logic 404 converts the incoming frames received from the network into the data and control signals that can be recognized by the multiprocessor computer, docking stations or portable computers. The frame processing logic also converts the outcomming signals into frames complying with the specific network protocols before sending them to the network.

Memory buffer 406 serves as a buffer for storing the incoming and outcomming data or control signals.

Request generator 407 at the side of the portable portion generates a connection request when the portable computer is connected to the network, and a disconnection request when the portable computer is being removed from the network. A specific implementation to generate the connection and disconnection requests is to deploy a mechanical structure having a locked position and a unlocked position on the connector between the network and the portable computer. When the mechanical structure is being moved to locked position, it will trigger the request generator to generate the connection signal; when the mechanical structure is being moved to the un-locked position, it will trigger the request generator to generate the disconnection request.

Connection confirmation logic 408 can confirm the connection and disconnection of a portable computer. When a portable computer is being connected to the network, it sends the connection request to the connection confirmation logic located at the side of the selected docking station (or at the side of the multiprocessor computer shown in FIG. 2B) via the network. Upon receiving the connection request, the connection confirmation logic at the side of the docking station (or at the side of the multiprocessor computer shown in FIG. 2B) confirms the connection.

When a portable computer is being disconnected from a docking station (or the multiprocessor computer shown in FIG. 2B), it sends the disconnection request to the connection confirmation logic at the side of the docking station (or at the side of the multiprocessor computer shown in FIG. 2B via the network). Upon receiving the disconnection request, the connection confirmation logic at the side of the docking station (or at the side of the multiprocessor computer) confirms the disconnection.

In response to a connection request or a disconnection request, the connection confirmation logic at the side of the docking station (or at the side of the multiprocessor computer) sends a connection confirmation signal or a disconnection confirmation signal to parallel interconnecting control logic 269 in FIG. 2B, to parallel interconnecting control logic 368 in FIG. 3C, or to switching logic 390 in FIG. 3D.

In FIG. 2B, parallel interconnecting control logic 269 sets the processor modules 1–4 and portable computer 258 in parallel fashion to run the multiprocessor computer, in response to the connection confirmation signal; parallel interconnecting control logic 269 sets the processor modules 1–4 to run the multiprocessor without the portable computer, in response to the disconnection confirmation signal.

In FIG. 3C, parallel interconnecting logic 368 sets co-processor 362 and notebook computer 336 in parallel fashion to run docking station 308, in response to the connection confirmation signal; parallel interconnecting logic 368 sets co-processor 362 to run docking station 308 independently without notebook computer, in response to the disconnection confirmation signal.

In FIG. 3D, switching logic 390 connects notebook computer 336 to, and disconnects co-processor 382 from, control logic 386, in response to the connection confirmation signal; switching logic 390 connects co-processor 382 to, and disconnects notebook computer 336 from, the control logic, in response to the disconnection confirmation signal.

Processor unit 412 can control the overall operation of network connection logic (285, 287, 335, or 337), and execute the instructions (or commands) stored in memory buffer 406.

When portable computer 258 or 336 in FIGS. 2B, or 3B–3E wants to control the operation of the stationary portion, it sends an instruction set and necessary data to a selected stationary portion via network. Under the control of processor unit 412, the network connection logic at the side of the stationary portion receives this instruction set and store it into a designated area in memory buffer 406. Processor unit 412 then executes the instruction set as if it acts for the portable portion after the instruction set and data have been stored into memory buffer 406.

The advantages of the present invention are as follows:

(1) a system's resource can be efficiently used when the portable portion is removed from the system;

(2) the portable portion's processing capability is enhanced by the stationary portion when it is connected to the stationary portion of a system; and (3) a portable portion can be remotely connected to multiple stationary portion of a system.

While the particular embodiments of the present invention have been described in detail, it should be understood that the invention may be implemented through alternative embodiments. Thus, the scope of the invention is not intended to be limited to the embodiments described above, but is to be defined by the appended claims.

What is claimed is:

1. A computer system comprising:

a stationary portion including a plurality of stationary processor modules;

a portable portion including a portable processor module; and interface circuitry for connecting said plurality of stationary processor modules to enable said stationary processor modules to be operated in a parallel fashion when said portable processor module is disconnected from said stationary processor modules, and for connecting said plurality of stationary modules and portable module to enable said stationary processor modules and said portable processor model to be operated in a parallel fashion when said portable processor module is connected to said stationary portion;

wherein said portable portion is able to operate independently after being disconnected from said stationary portion.

2. The computer system of claim 1, said stationary portion further comprising:

a plurality of input/output devices;

wherein said stationary processor modules and said portable processor module are able to operate said input/output devices when said portable processor is coupled to said stationary portion;

wherein said stationary processor modules are able to operate said input/output devices when said portable processor is disconnected from said stationary portion.

3. The computer system of claim 1, wherein said stationary processor modules and said portable processor module are able to share hardware and software resources when said portable processor is coupled to said stationary portion.

4. The computer system of claim 1, wherein said portable processor module is coupled to said stationary portion via a cable, fiber, or wireless communication channel.

5. A computer system comprising:

a stationary portion including at least one stationary processor module;

a portable portion including a portable processor module; and switching circuit for switching said stationary processor module and said portable processor module;

wherein said switching circuit is able to disconnect said stationary processor module from said stationary portion when said portable processor is coupled to said stationary portion;

wherein said switching circuit is able to connect said stationary processor module to said stationary portion when said portable processor is disconnected from said stationary portion.

6. The computer system of claim 5, said stationary portion including an interface circuit.

7. The computer system of claim 5, said portable portion being able to operate independently.

8. The computer system of claim 5, wherein said portable processor module is coupled to said stationary portion via a network.

9. The computer system of claim 5, further comprising:

a plurality of input/output devices;

wherein said portable processor module is able to operate said input/output devices when said portable processor module is coupled to said stationary portion;

wherein said stationary processor module is able to operate said input/output devices when said portable processor is disconnected from said stationary portion.

10. The computer system of claim 5, wherein said portable processor module is coupled to said stationary portion via a cable, fiber, or wireless communication channel.

* * * * *